April 4, 1950  S. N. BUCHANAN  2,503,094
COUPLING DEVICE
Filed April 26, 1947  3 Sheets-Sheet 1
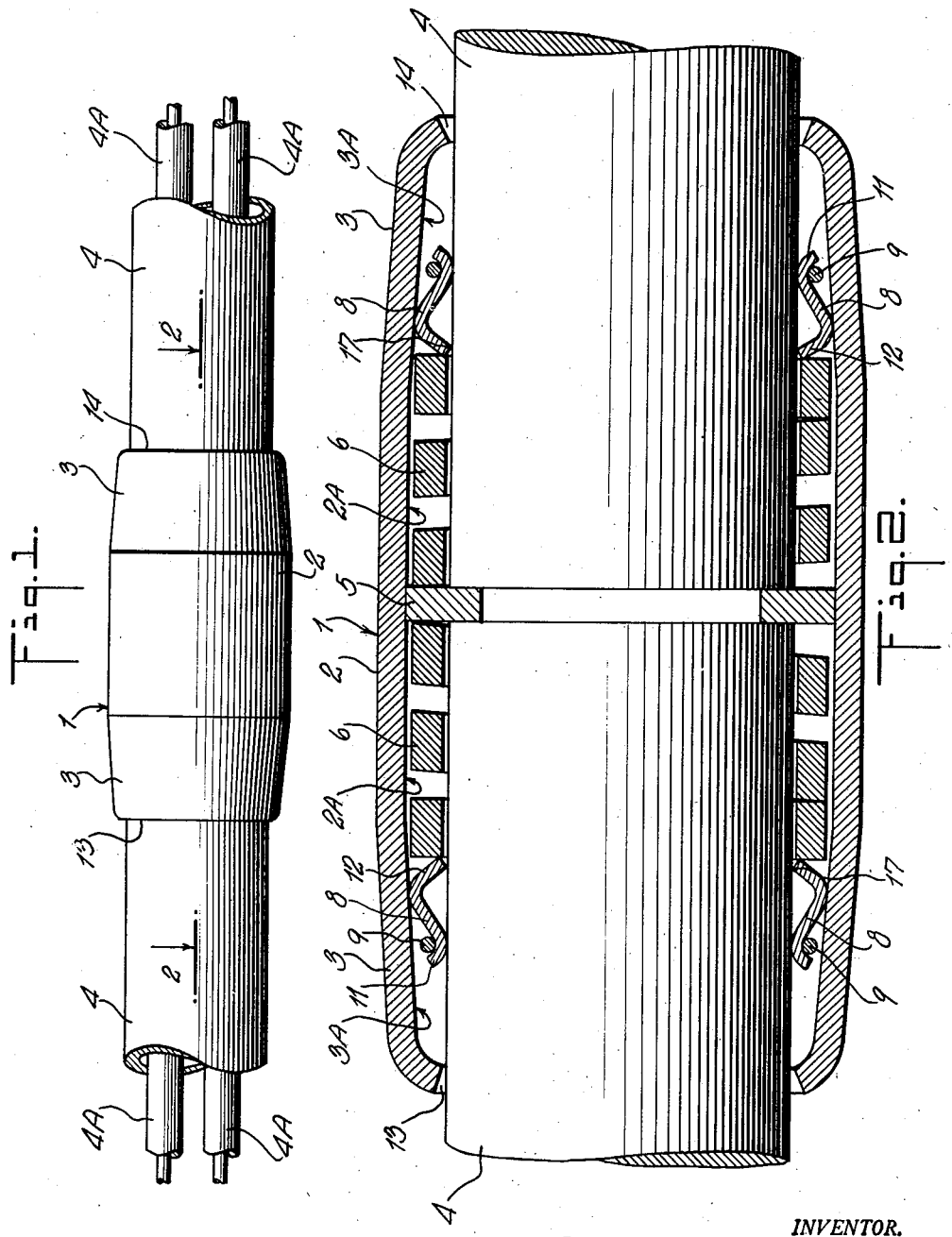
INVENTOR.
STEPHEN N. BUCHANAN
BY
Arthur G. Rangley
ATTORNEY

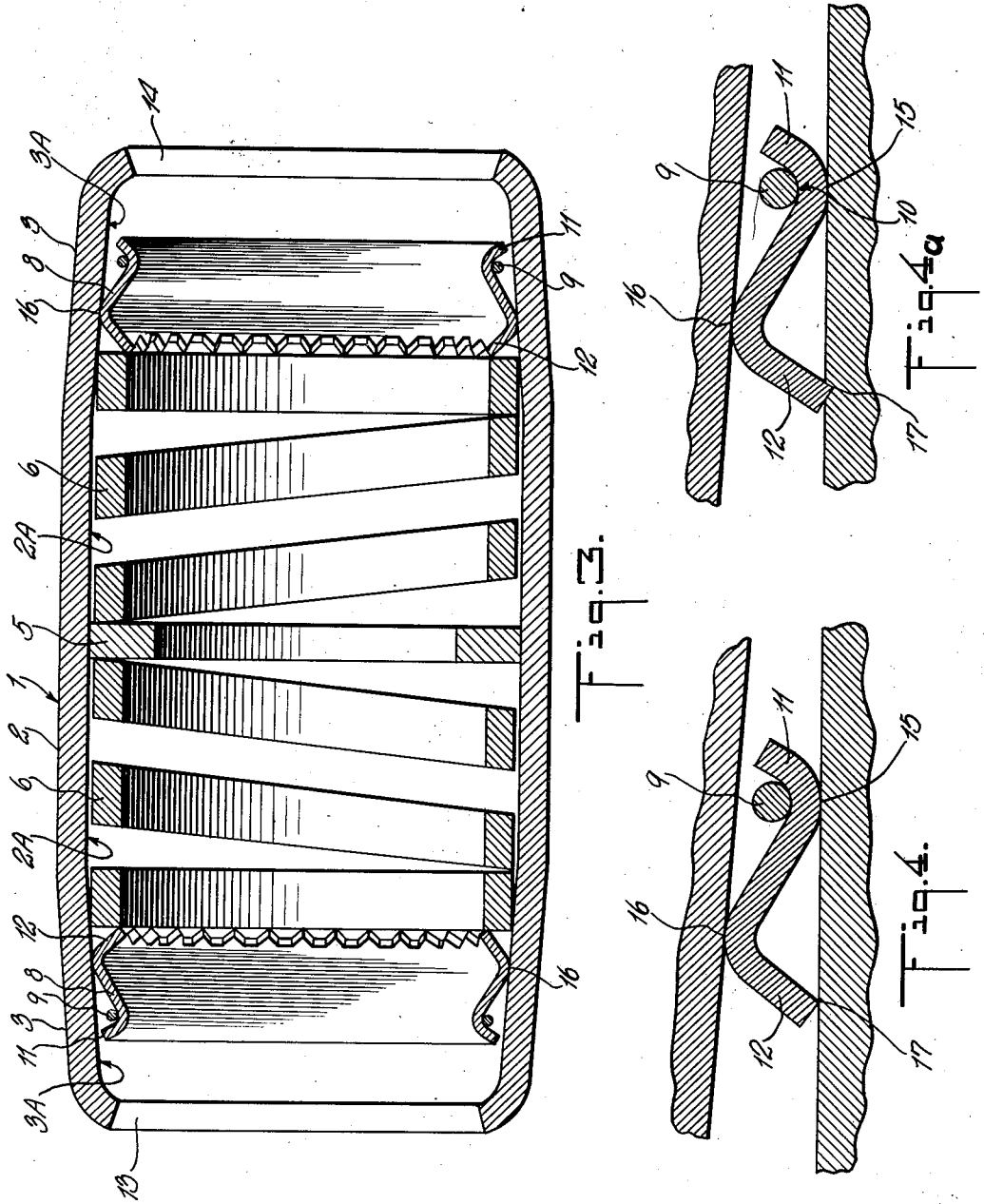

April 4, 1950 S. N. BUCHANAN 2,503,094
COUPLING DEVICE
Filed April 26, 1947 3 Sheets-Sheet 3
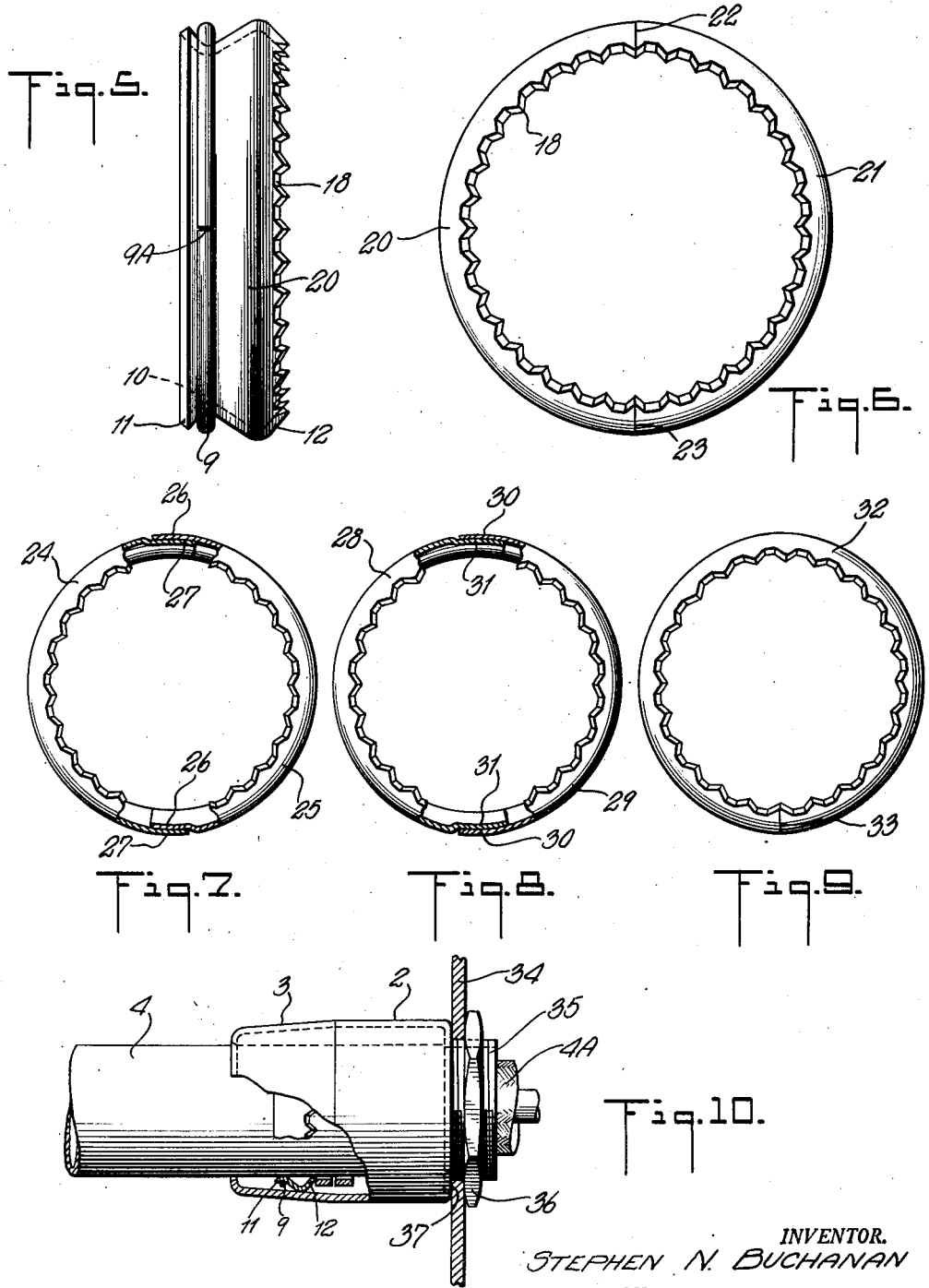
INVENTOR.
STEPHEN N. BUCHANAN
BY
Arthur G. Rangley
ATTORNEY Patented Apr. 4, 1950

2,503,094

UNITED STATES PATENT OFFICE 2,503,094

COUPLING DEVICE

Stephen N. Buchanan, Westmoreland Hills, Md., assignor to Buchanan Electrical Products Corporation, Elizabeth, N. J., a corporation of New Jersey Application April 26, 1947, Serial No. 744,079

2 Claims. (Cl. 285—193)

This invention relates to devices for receiving and gripping cylindrical members having a smooth cylindrical surface, with special reference to devices for coupling elongated electrical conduits having smooth cylindrical external surfaces.

Numerous devices are known wherein the securing, holding or coupling action is effected by means of threaded parts requiring the threading of one or more parts upon another part or parts to make the connection or assembly. Such devices are not only expensive to make, but also time consuming in the use thereof. Proposals have been made to surmount those difficulties. However, as far as known, those attempts have been abortive or unsuccessful for one reason or another.

Among the objects of the present invention are included the objects of making devices of the character described which can not only be manufactured, used and sold economically, but also greatly decrease time involved in the use thereof. The time factor is of great importance because of increased labor costs and, of course, economy in manufacturing costs is also very important.

Certain illustrative embodiments will be described in the description which follows and in the drawings, it being understood that modifications may be made within the scope of the invention as claimed without departing therefrom.

In the drawings—

Fig. 1 is a plan view of a coupling;

Fig. 2 is a sectional view on line 2—2 of Fig. 1;

Fig. 3 is another sectional view similar to Fig. 2;

Fig. 4 is an enlarged fragmentary sectional view of the ring gripping member to illustrate its action during the insertion of a conduit into the socket or coupling;

Fig. 4A is an enlarged fragmentary view similar to Fig. 4, but showing the action of the ring gripping member in preventing withdrawal of a cylindrical member or conduit from the socket or coupling;

Fig. 5 is an end view of one form of gripping member;

Fig. 6 is a plan view of the member shown in Fig. 5;

Fig. 7 is a plan view of a modified form of gripping member;

Fig. 8 is a plan view of another modified form of gripping member;

Fig. 9 is a plan view of another modified form of gripping member; and

Fig. 10 is a view partly in section of the application of the principles of the invention to a single socket, instead of a double socket or coupling as illustrated in the other views.

In accordance with the invention a housing is provided which has walls, the interior surfaces of which have a smooth bore. These interior surfaces or bore define a receiving space for an elongated member, particularly an elongated thin walled electrical conduit having a smooth cylindrical external surface. The said walls terminate at one end in edge portions which define a circular entrance port for said cylindrical member. At the other end of the said walls, stop means are provided which project inwardly from said walls, the said stop means being spaced axially from the entrance port. The internal surfaces or bore of the housing is tapered adjacent the entrance port and the smooth bore tapered walls converge toward the cylindrical member and in the direction of the entrance port, assuming of course that the said cylindrical member has been inserted into said housing. The housing has mounted therein a gripping member in the form of a ring which is radially expansible and contractable, and is also resilient and metallic. The edge portions of the ring which face the entrance port are flared outwardly to provide a sort of bell mouth structure which facilitates insertion of the electrical conduit. The opposite edge portions of the gripping ring member are not flared and, on the contrary, converge toward each other in the direction of the stop and the convergent edge portions terminate in a biting edge which engages the smooth cylindrical surface of the conduit. That biting edge does not in any way interfere with the insertion of the conduit in the housing because the ring expands radially and the smooth cylindrical surfaces of the conduit ride very easily over the biting edge. However, when an attempt is made to withdraw the conduit from the housing, then the ring member radially contracts, becomes wedged between the tapered internal surfaces of the housing and the opposed cylindrical surfaces of the conduit, and the said biting edge bites into the conduit and effectively prevents withdrawal thereof from the housing. The ring member also has preferably two reversely curved portions intermediate between the flared and convergent edge portions. One of those curved portions is well adapted for sliding engagement with the smooth cylindrical surface of the conduit inserted into the housing and the other curved portion is equally well adapted for sliding engagement with the tapered internal surface or bore of the housing. The said ring member is mounted in the housing and is biased axially in the direction of the entrance port by means of a resilient member which is preferably a coil spring confined between the stop member and ring member with ends engaging each of said stop ring members repectively and the internal diameter of the said coils is sufficient to permit insertion of the conduit or cylindrical member through those coils in an axial direction so that the said conduit may be inserted into the housing as far as said stop. In some cases it may be desirable to omit the stop entirely and utilize a single continuous coil spring member. That, however, would be the case where a coupling is used, having two entrance ends and two ring gripping members adjacent said ends respectively with a single continuous coil spring member confined between said gripping members. Where a single socket device rather than a coupling is employed, a stop is necessary and even with a coupling as shown in Figs. 1 to 3 for example, a centrally located stop is preferred.

The above generic description applies either to a coupling for coupling together two conduits, as illustrated in Figs. 1, 2 and 3 for example, or to a single socket device to connect a single conduit to a base as, e. g., to an outlet box as illustrated in Fig. 10. It will be understood that a coupling is essentially two sockets joined end for end. Of course, the invention is not limited to a coupling device for coupling two conduits because the principles could readily be extended in the light of the description to provide a T for coupling three conduits, or a cross for coupling four conduits.

Having in mind the above generic description, reference will now be made to the illustrative details of the particular structures shown in the drawings.

The housing 1 has a cylindrical portion 2 with cylindrical internal surfaces 2A and tapered portions 3 with internal surfaces 3A, the surfaces 2A and 3A providing a smooth internal bore. The bores may be tapered all the way from the stop 5 toward the entrance ports 13 and 14 respectively, although preferably only a portion of the internal bores are tapered providing the tapered internal surfaces or bores 3A as shown. The housing 1 especially adapted as a coupling device for hollow electrical conduits 4, having smooth external cylindrical surfaces and it will be clear that, when the conduits 4 are connected together as illustrated, electrical cables 4A may be threaded thorugh the conduits thus coupled. It will be noted that the walls 3 and internal surfaces 3A taper or converge toward the external cylindrical surface of the conduit 4 inserted into the housing and in the direction of the entrance ports 13, 14 respectively, and that the angle of convergence is a small acute one. That angle is preferably about 4°. The walls of the conduit terminate in edge portions 13, 14 which define circular entrance ports. At the central portion of the coupling, there is a stop 5 which may be an annular member projecting inwardly.

In the housing there is mounted a ring or annular locking or gripping member, the preferred form of which is shown in Figs. 2, 3, 5 and 6 (other forms being illustrated in Figs. 7, 8 and 9). Figs. 4 and 4A show a cross section of the gripping member from which it will be seen that there are reversely curved portions having rounded surfaces 15 and 16 which are well adapted for sliding engagement with the adjacent surfaces of the housing and inserted conduit respectively. There are also edge portions 11 flared outwardly to provide a sort of bell mouth structure to facilitate insertion of the conduit. Then there are opposite edge portions 12 which converge toward each other and toward the cylindrical surface of the inserted conduit and terminate in a biting edge 17 which may have a saw tooth structure as shown in Figs. 3, 5, and 6. The curvature mentioned, in addition to the other advantages, provides a groove which may advantageously be used to carry a retaining member 9 to hold the parts of the gripping member 8 in proper alinement with the gripping member 8 made in parts or halves.

The gripping elements 8 are mounted in the housing 1 as shown and are biased toward the adjacent entrance ports 13, 14 respectively by spring 6 which as shown may be coil springs abutting at one end against the gripping member, and at the other end against the stop 5 and, therefore, being confined respectively between the gripping member and the stop. The springs 6, as well as the gripping elements 8, may be made of any suitable resilient metal, including steel.

The gripping member shown, e. g. in Figs. 5 and 6, has a slightly elliptical configuration in plan view, which may be obtained by first making the ring circular and then cutting out small portions of the ring at diametrically opposite points so that, when the two separate parts 20, 21 thus produced are put together with the edges abutting at 22, 23, a slightly elliptical shape is obtained. It is then necessary to have a suitable retaining member to keep the parts in proper alinement. For such purpose a simple split ring 10 may be employed, the split being indicated as 9A in Fig. 5. Figs. 7 and 8 also show a slightly elliptical gripping member, the structure of which is somewhat different from that shown in Figs. 5 and 6 in that, instead of being split at portions 22, 23, as shown in Fig. 6, the said portions have overlapping edges. In Fig. 7 the overlapping edges are 26, 27, and in Fig. 8 the overlapping edges are 30, 31. The type shown in Fig. 8 would not require a retaining member 9A to keep the parts 28, 29 together, whereas the type shown in Fig. 7 should preferably have such retaining member to keep the parts 24, 25 thereof in proper alinement.

In Fig. 9 is shown a gripping member 32 which is circular in shape and is split at only one point 33. All the ring members shown in Figs. 6, 7, 8 and 9 have the same structure except for the differences which have been described, i. e., they all have in common the cross section clearly shown in Figs. 4, 4A.

In Fig. 10 there is shown a single socket or connector having cylindrical portion 2 and tapered portion 3 which is used to connect a smooth wall cylindrical conduit into an outlet box having a wall 34. The socket has the same internal configuration illustrated in the other figures with the gripping member 8 mounted therein and functioning in the manner described herein. The socket member has a shoulder or stop portion 37 against which the conduit 4 abuts when it is inserted into the socket, and the socket also has a threaded nipple 35. By means of lock nut 36 acting on the threaded nipple 35, the socket may be secured to any appropriate structure, e. g., outlet box having wall 34.

Having descried fully the structure of the invention, it is believed that the use and portion thereof will be very clear to those skilled in the art. Looking for example at Figs. 2 and 3, taken in conjunction with Figs. 4, 4A, 5 and 6, it will be seen that when it is desired to couple the conduits 4 together, they will be inserted into the housing at the entrance ports 13, 14 respectively. The leading edges of the conduits will strike the flared or bell mouth portion 11 of the gripping element 8 and displace it in the direction of the stop 5, thus causing the parts, e. g., parts 20, 21 (note Fig. 6) and the gripping ring element 8 to open up and expand radially. The smooth cylindrical surface of the cylindrical members or conduits will then easily ride over the rounded, riding surfaces 15 and will then also ride over the biting edges 17 and the said conduits will finally be stopped against the stop 5. In this action the resilient spring members 6 are, of course, compressed. Such coupling action, it will be noted, requires only the period of time necessary to thrust the conduit ends into the housing and the time consumed is, therefore, extremely short. The coupling thus made is quite permanent because the conduits cannot be withdrawn from the housing. The action of the locking element during insertion of the conduits is further illustrated in Fig. 4 and the action during an attempt to withdraw the conduits is illustrated in Fig. 4A. It will be noted that an attempt at withdrawal of the conduits causes a wedging action of the locking element with a tendency to displace it in the direction of the entrance ports and, consequently, a radial contraction of the gripping element whereby the biting edge 17 bites into the smooth cylindrical surface of the conduits, as illustrated in Fig. 4A, and effectively prevents withdrawal.

It is, of course, possible to make the coupling device in two parts so that the housing may be separated into two parts and the coupling taken apart in that manner. For example, the housing may have corresponding threaded portions which engage each other in the assembly of the housing and which may be disengaged if it is desired to dismantle the housing. However, once the housing is made, whether it is made all in one piece or more than one piece, the operation of the housing whereby it functions as a coupling does not require the use of any threaded parts.

What is claimed is:

1. A pipe coupling including a substantially cylindrical housing having an opening with a tapered surface adjacent the opening and a stop spaced from the opening, a radially expansible and contractible resilient metallic ring gripping member mounted in said housing, said ring member having a flared edge facing the said opening and the opposite edge portions converging towards each other in the direction of the stop and terminating in a biting edge to engage a pipe, said ring member also having two reversely curving portions intermediate the flared and convergent edge portions, said reversely curved portions being adapted for sliding engagement with the tapered portion of the housing and the pipe to be inserted therein, and a coil spring mounted in said housing and confined between said stop and ring member.

2. A pipe coupling including a substantially cylindrical housing having openings at opposite ends and tapered portions extending from the opening and a stop located intermediate the two ends, a radially expansible and contractible resilient metallic ring gripping member mounted in each end of said housing, each of said ring members having a flared edge facing the opening and opposite edge portions facing towards each other in the direction of the stop and terminating in a biting edge to engage the surface of a pipe, each of said ring members also having two reversely curved portions intermediate the flared and convergent edge portions, said reversely curved portions being adapted for sliding engagement with one of the tapered surfaces of the housing and the pipe to be inserted thereinto, respectively, and coiled springs mounted in said housing and confined between said stop and ring members, respectively.

STEPHEN N. BUCHANAN.

REFERENCES CITED

The following references are of record in the file of this patent:

UNITED STATES PATENTS

| Number | Name | Date |
|---|---|---|
| 1,197,813 | Frilick | Sept. 12, 1916 |
| 2,017,994 | Spang | Oct. 22, 1935 |
| 2,250,477 | Fleischman | July 29, 1941 |